United States Patent [19]
Perkins et al.

[11] Patent Number: 5,859,660
[45] Date of Patent: Jan. 12, 1999

[54] NON-SEAMLESS SPLICING OF AUDIO-VIDEO TRANSPORT STREAMS

[76] Inventors: Michael G. Perkins, 506 W. Linden, Louisville, Colo. 80027; William L. Helms, 4682 White Rock Cir., Boulder, Colo. 80301

[21] Appl. No.: 609,132

[22] Filed: Feb. 29, 1996

[51] Int. Cl.⁶ .................................................. H04N 7/10
[52] U.S. Cl. ................................................ 348/9; 348/584
[58] Field of Search ............................... 348/9, 6, 7, 12, 348/13, 907, 10, 8, 845.2, 845.3, 584, 578; 455/6.1, 5.1, 4.2, 3.1; 358/86; H04N 7/10

[56] References Cited

U.S. PATENT DOCUMENTS

| | | | |
|---|---|---|---|
| 4,724,491 | 2/1988 | Lambert | 358/86 |
| 5,027,400 | 6/1991 | Baji et al. | 358/86 |
| 5,200,825 | 4/1993 | Perine | 358/86 |
| 5,216,515 | 6/1993 | Steele et al. | 358/86 |
| 5,392,066 | 2/1995 | Fisher T Al. | 348/8 |
| 5,412,416 | 5/1995 | Nemirofsky | 348/10 |
| 5,424,770 | 6/1995 | Schmelzer et al. | 348/9 |
| 5,446,919 | 8/1995 | Wilkins | 348/10 |
| 5,534,944 | 7/1996 | Egawa et al. | 348/584 |
| 5,600,366 | 2/1997 | Schulman | 348/9 |

OTHER PUBLICATIONS

S. Merrill Weiss, "*Switching Facilities in MPEG–2: Necessary But Not Sufficient*", SMPTE *Journal*, pp. 788–802, Dec. 1995.

C. Brechin, "*Advantages of digital ad insertion*", Communications Technology, pp. 50–54, May 1995.

T. Walsh, *Ad insertion system architecture*, Communications Technology, pp. 56–66, May 1995.

R.J. Kelso, *Balancing act: Digital ad insertion over mulitiple zones*, Communications Technology, pp. 68–74, May 1995.

*Primary Examiner*—Brian Casler
*Assistant Examiner*—Luanne P. Din
*Attorney, Agent, or Firm*—Proskauer Rose LLP

[57] ABSTRACT

A method and apparatus for non-seamless splicing of audio-video transport streams configured in accordance with MPEG-2 or other suitable techniques. A first transport stream is to be spliced with a second transport stream at a splice point. The first stream is configured such that the final first stream frame to be displayed will be a black frame or will have another suitable characteristic. Null packets are then delivered in place of the first stream transport packets for a predetermined period of time after the splice point. The predetermined time is generally greater than the sum of the splice decoding delay associated with the splice point and the maximum frame duration in the first stream. The transport packets of the second stream are then delivered. Null packets may be again delivered for a period of time sufficient to allow the final frame of the second stream to be displayed. The final first stream frame can be guaranteed to be a black frame by directing a digital stream insertion device to insert a black I-frame followed by an end-of-sequence code into the first stream. Alternatively, the final first stream frame could be forced to black during an encoding operation, and an end-of-sequence code could then be inserted at the splice point.

22 Claims, 4 Drawing Sheets

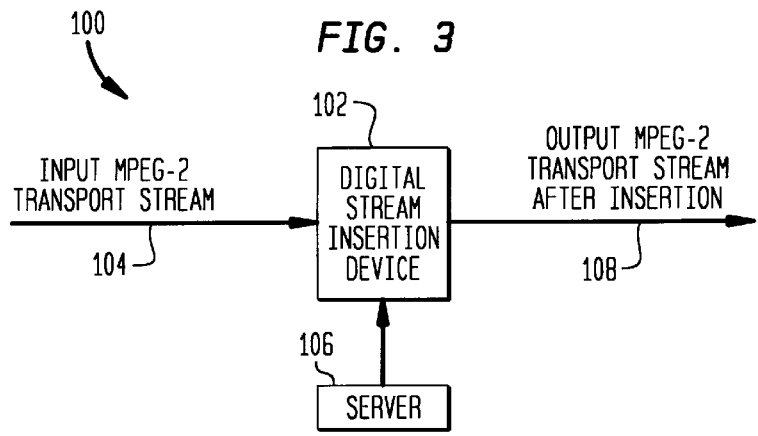
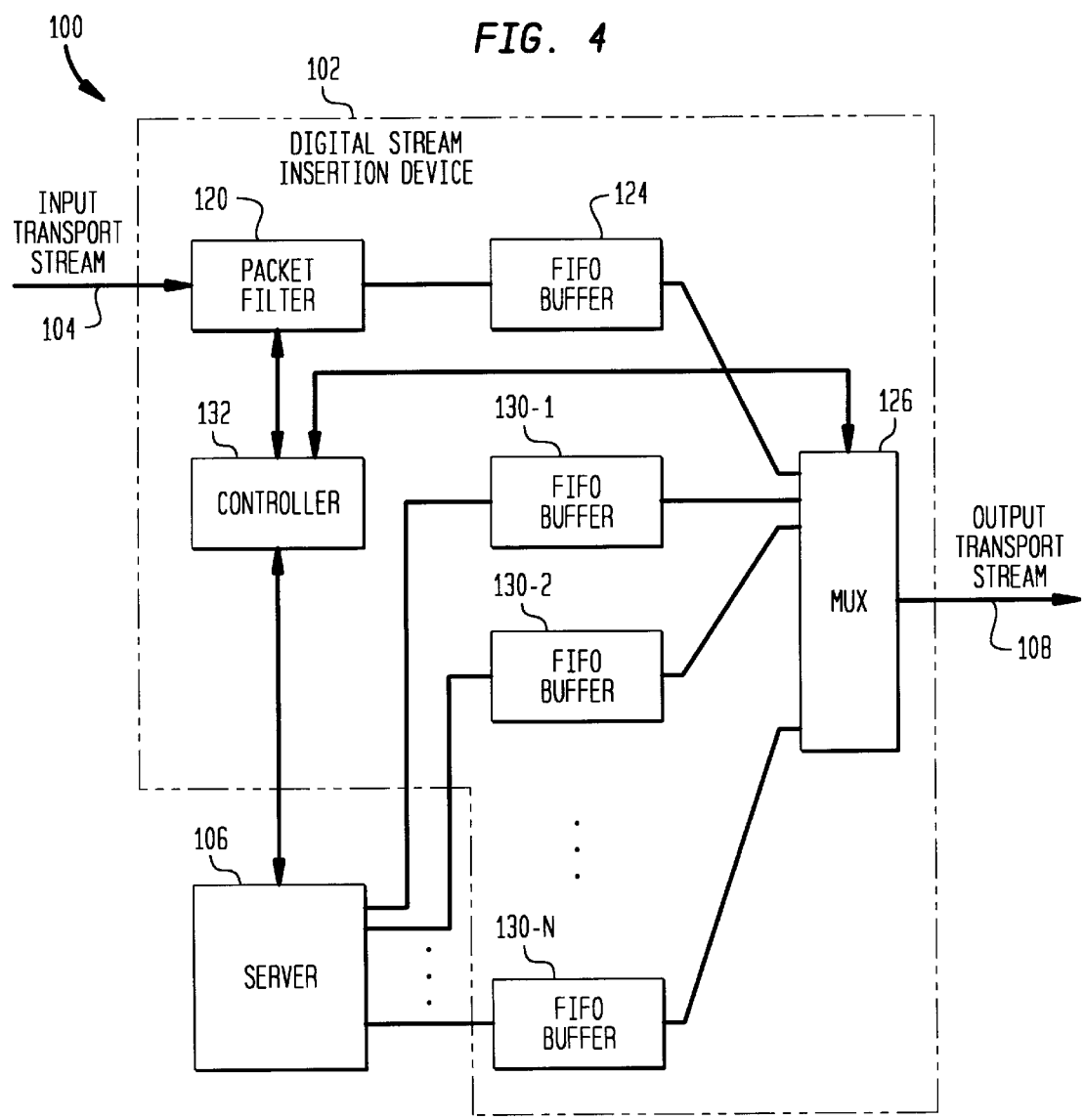

NON-SEAMLESS SPLICING OF AUDIO-VIDEO TRANSPORT STREAMS

FIELD OF THE INVENTION

The present invention relates to hierarchically-organized audio-video signals such as MPEG-2 transport streams. More particularly, the present invention relates to the non-seamless splicing of multiple transport streams.

BACKGROUND OF THE INVENTION

It is important in many video processing applications to accurately splice together bit streams from different video sources. The advent of digital video compression standards such as MPEG-2 has substantially increased the complexity of video splicing. Issues which arise when performing splicing operations on compressed digital streams include time-base synchronization, buffer management, audio/video format changes and audio/video synchronization. Failure to properly address these issues in the splicing operation can produce undesirable results at a decoder which receives the composite stream. The undesirable results include audio and video artifacts, decoder buffer overflows and underflows, and unsynchronized audio and video.

The MPEG-2 standard is used in digital multimedia applications which require efficient compression and transmission of video, audio and other information. The MPEG-2 standard was developed by the International Standards Organization (ISO) Moving Pictures Expert Group (MPEG) and is documented in ISO/IEC IS 13818-1, "Information Technology-Generic Coding of Moving Pictures and Associated Audio Information: Systems," ISO/IEC IS 13818-2, "Information Technology-Generic Coding of Moving Pictures and Associated Audio Information: Video" and ISO/IEC IS 13818-3, "Information Technology-Generic Coding of Moving Pictures and Associated Audio Information: Audio." The above-cited ISO documents are incorporated herein by reference. The systems specification of MPEG-2 provides a multi-layer hierarchical organization for multiplexing and transmission of audio-video data streams, and is described in greater detail in A. Wasilewski, "MPEG-2 Systems Specification: Blueprint for Network Interoperability," Communications Technology, February 1994, which is incorporated by reference herein. The MPEG-2 video and audio specifications provide compression and encoding of video and audio data streams. MPEG video compression is described in greater detail in D. LeGall, "MPEG: A Video Compression Standard for Multimedia Applications," Communications of the ACM, Vol. 34, No. 4, pp. 46–58, April 1991, which is incorporated by reference herein.

The systems aspects of the MPEG-2 standard generally involve multiplexing several elementary streams from one or more programs to form a higher level packet-based stream. A given program may correspond to one or more television or motion picture signals and may include multiple elementary streams in the form of separately-encoded compressed video and audio data streams, as well as other program data streams such as closed caption text. The higher level packet-based stream in accordance with the MPEG-2 standard may be either a program stream or a transport stream. An MPEG-2 program stream generally carries a single program such that all elementary streams in the program stream share a common time base, while an MPEG-2 transport stream can carry elementary streams from multiple programs with different time bases.

The program and transport streams associate related elementary data streams for a given program or programs such that the elementary streams can be extracted, decoded and presented together in a coherent fashion. The program and transport streams may be recorded on or played back from a digital video disc (DVD), video tape, magnetic or optical disk drive or other suitable storage device. It should be noted that both program streams and transport streams may be considered part of a transport layer in accordance with the ISO network reference model as set forth in the ISO 7498 standard. The term "transport stream" as used herein is therefore intended to include both MPEG-2 program streams and transport streams as well as other packet-based data streams formed in accordance with standards other than MPEG-2.

The elementary stream data is separated in accordance with the MPEG-2 standard into a sequence of variable-length packetized elementary stream (PES) packets. The PES packet structure separates the relatively long elementary streams into more manageable units, and permits the attachment of timing, identification and control information to particular portions of an elementary stream. A given PES packet has a PES header and a quantity of elementary stream data. The PES header may include timing information such as presentation time stamps (PTSs) and display time stamps (DTSs). Each PES packet is packetized into a plurality of fixed-length 188-byte transport packets which form an MPEG-2 transport stream.

FIG. 1A shows a portion of an MPEG-2 transport stream. Each transport packet includes a variable-length packet header followed by a payload. The packet header includes an 8-bit sync pattern which identifies the beginning of the transport packet, and a 13-bit packet identifier (PID) which identifies the data being carried by the transport packet. All PES-bearing transport packets with a given PID carry elementary stream data for only a single elementary stream and no other. The exemplary transport packet shown also includes a variable-length adaptation field which will be described in greater detail below. The transport packet header also includes two adaptation field control bits which indicate whether the corresponding transport packet includes a payload with no adaptation field, an adaptation field with no payload, or both an adaptation field and a payload as in FIG. 1A. The header also includes an error indicator bit, a payload unit start indicator bit, a transport priority bit, two transport scrambling control bits and a four-bit continuity counter. The payload portion of the transport packet will include elementary stream data from a corresponding PES packet if the transport packet is of the PES-bearing type. The transport packet may also be of the program specific information (PSI) type or the private data type.

FIG. 1B shows the format of an exemplary adaptation field in an MPEG-2 transport packet. The adaptation field may include a 42-bit program clock reference (PCR) which represents the value of the system time clock (STC) for a given program at the time when the PCR bits were inserted into the transport stream. Each program may have a different STC and therefore transport packets carrying elementary streams from different programs will generally have asynchronous PCRs. The PCR bits include thirty-three bits of PCR-BASE and nine bits of PCR-EXT. The PCR-EXT is a modulo-300 counter incremented at a clock rate of 27 MHz. The PCR-BASE is incremented after every 300 increments of the 27 MHz clock and thus represents a thirty-three bit counter operating at about 90 kHz. The PCR information is inserted into a transport packet during an encoding or multiplexing operation and is utilized in transport packet decoding to initialize and maintain the decoder system clock. Synchronization of audio, video and data streams within a given program is provided using the PCR information as well as the PTSs and DTSs which may be placed in the PES packet header.

Other elements of the exemplary adaptation field of FIG. 1A particularly relevant to splicing operations will now be described. A discontinuity indicator bit in the adaptation field is used for identifying time base discontinuities and continuity counter discontinuities. A time base discontinuity can occur in a packet with a PID designated as a PCR_PID and indicates that the next program clock reference (PCR) in a transport packet with the same PID represents a sample of a new STC for the associated program. It should be noted that portions of PES packets with PTS or DTS values referring to the new time base may not occur in the transport stream prior to the transport packet with the first PCR of the new time base. Also, once the transport packet with the first PCR of the new time base has occurred, portions of PES packets with PTS or DTS values that refer to the old time base may not occur. A continuity counter discontinuity indicates that the continuity counter field for a given transport packet may be discontinuous with respect to the previous transport packet having the same PID. If this PID is also the PCR_PID, then the continuity counter may only be discontinuous in the packet that contains the time base discontinuity.

An optional 8-bit splice countdown field serves to provide advance warning of a splice point by indicating the number of packets with the same PID which will arrive prior to the splice point. The countdown will reach zero in the packet immediately prior to the splice point. The packet in which the splice countdown is zero can thus be used to identify a splice point in a given transport stream. Following the splice point, the splice countdown field may take on negative values indicating that the splice point occurred a given number of packets previously. A splicing point flag is used to indicate whether or not the splice countdown field is present.

For video transport packets, an optional 4-bit splice type field specifies one of several different splice types depending on the video profile and level. The 4-bit value serves as an index to a table which specifies a splice decoding delay and a maximum splice rate, both of which represent restrictions on construction of a seamless splice. The splice decoding delay essentially specifies the buffer fullness at the splice point, while the maximum splice rate gives the maximum supported rate of the new stream such that decoder underflow or overflow will not occur. For audio transport packets, the splice type is set to "0000."

A 33-bit DTS_next_au field indicates the decoding time of the first access unit following the splice point in the event that no splice operation is performed. An access unit is a coded picture or audio frame and thus part of an elementary stream. A seamless splice flag is used to indicate the presence of splice type and DTS_next_au fields. This flag is not set to "1" unless the splicing point flag is also set to "1", and once set to "1" it remains set as long as the splice countdown field is positive.

FIGS. 2A–2C illustrate the importance of decoder buffer management in an exemplary transport stream splicing operation. If the splicing operation does not take into account the buffer trajectories of the two streams that are being spliced, there will be a high probability of either an underflow or an overflow of the decoder buffer. FIGS. 2A–2C show buffer trajectories for sequences of intra-coded (I), predictive-coded (P) and bidirectionally predictive-coded (B) MPEG-2 frames making up different transport streams. The buffer trajectories are typically provided by a video buffering verifier (VBV) in an encoder which generates the corresponding streams. FIG. 2A shows the decoder buffer trajectory for a first transport stream in which the P-frame designated by the arrow is the first frame to be replaced by another stream in a splicing operation. The first transport stream is also referred to herein as an input transport stream. FIG. 2B shows the decoder buffer trajectory for a second transport stream to be spliced into the first stream beginning with the I-frame designated by the arrow. The second transport stream is also referred to herein as an insertion stream. It can be seen from FIGS. 2A and 2B that both the first and second streams result in a decoder trajectory which remains below a maximum decoder buffer capacity. FIG. 2C shows the stream resulting from splicing the second stream beginning with the designated I-frame in place of a portion of the first stream beginning with the designated P-frame. The splice point is indicated by a solid arrow. The splice results in a decoder buffer overflow condition as indicated by a dashed arrow.

A number of other problems can arise in transport stream splicing. The problem of time base synchronization arises because the STCs used to generate the PCRs of the transport streams to be spliced will generally be asynchronous. The resulting time base discontinuity must be taken into account to avoid decoder buffer overflow and underflow. For example, if a time base discontinuity occurs, and a sequence of frames from the first stream remains in the decoder buffer, the frames may not be decoded properly. Because the decoding and presentation timestamps of the first stream reference a time base unrelated to that of the second stream, the decoder may incorrectly process those frames, resulting in a decoder buffer overflow. Other problems include the different durations of video and audio access units which prevent simultaneous seamless splicing of video and audio, the need to use closed prediction on the splice boundaries, the possibility of splicing from MPEG-1 to MPEG-2 video, and the possibility that the resolution or profile may change for video or that the sample rate or coding layer may change for audio.

The MPEG-2 standard supports both seamless and non-seamless splices. Seamless splices generally do not result in decoding discontinuities. The decoding time of the first access unit from the insertion stream is thus consistent with the decoding time of the access units of the input stream in which it is inserted. In other words, the first access unit from the insertion stream will be decoded at the same time that the first post-splice access unit of the input stream would have been decoded if the splice had not occurred. This decoding time is referred to as the seamless decoding time. It should be noted that the lack of decoding time discontinuities generally does not ensure acceptable decoder buffer behavior. In order to prevent decoder buffer overflow or underflow, certain conventions must be followed in the encoding of the streams that are spliced.

Non-seamless splices can result in decoding discontinuities. This means that the decoding time for the first access unit from the insertion stream generally does not equal the seamless decoding time. However, it is possible to create non-seamless splices that produce no unacceptable artifacts and therefore appear seamless to the viewer. In terms of application, seamless splices are generally more likely to be used in the studio environment while non-seamless splices are more likely to be used in broadcast applications such as ad insertion.

One of the challenges of both seamless and non-seamless splicing of MPEG-2 transport streams is the fact the MPEG-2 standard does not specify the display process. In particular, the display behavior of a decoder after an end_of_sequence code and at a time base discontinuity is unspecified.

Prior art stream insertion techniques generally utilize digital techniques for storage and retrieval of the stream to be inserted and analog techniques for the actual insertion operation. Exemplary analog ad insertion systems are described in greater detail in C. Brechin, "Advantages of digital ad insertion," Communications Technology, pp. 50–54, May 1995 and T. Walsh, "Ad insertion system architecture," Communications Technology, pp. 56–66, May 1995. The analog ad insertion systems typically detect a cue tone in a broadcast program to determine when and where a commercial or other advertisement is to be inserted within the program. The stream to be inserted is retrieved and decoded to generate an analog signal which is applied to a switch or router for insertion into the broadcast program. Although analog systems produce acceptable results in many applications, such systems fail to take advantage of the flexibility offered by digital video standards such as MPEG-2. Other problems with the prior art analog insertion systems include the excessive equipment costs resulting from the use of multiple digital-to-analog decoders to convert multiple streams to analog format prior to insertion. A number of proposals for facilitating digital splicing of MPEG-2 bit streams are described in S. M. Weiss, "Switching Facilities in MPEG-2: Necessary But Not Sufficient," SMPTE Journal, pp. 788–802, December 1995. However, the proposals fail to provide a simple and efficient technique for non-seamless digital splicing of MPEG-2 transport streams. Also, prior art digital seamless splicing techniques may require the streams to be demultiplexed into their respective elementary streams prior to the splicing operation and then remultiplexed after splicing. These demultiplexing and remultiplexing operations can unduly increase the complexity and processing overhead associated with digital seamless splicing.

As is apparent from the above, there is a need for an improved technique for non-seamless splicing of transport streams which utilizes digital stream insertion and avoids the above-noted problems of the prior art.

SUMMARY OF THE INVENTION

The present invention provides a method and apparatus for splicing multiple transport streams. The stream insertion operation is entirely digital and utilizes the flexibility of current digital audio-video coding standards to provide non-seamless splicing which is generally acceptable to most viewers. The invention is particularly well-suited for use with MPEG-2 compliant transport streams.

In accordance with one aspect of the invention, a method of splicing transport streams is provided. The method includes the step of ensuring that a designated frame of a first transport stream will have a predetermined frame characteristic. The designated frame is the final first transport stream frame to be displayed before display of a second transport stream to be spliced with the first transport stream at a splice point. A frame with the predetermined frame characteristic may be a black frame. The method also includes the step of outputting transport packets having a predetermined packet characteristic in place of transport packets of the first stream for a period of time after the splice point. This period of time is greater than the splice decoding delay associated with the splice point. Packets with the predetermined packet characteristic may be null packets. The exemplary method concludes with the step of outputting transport packets of the second transport stream. The step of ensuring that the final first stream frame has the predetermined characteristic may be implemented by a digital stream insertion device inserting a black frame followed by an end-of-sequence (EOS) code into the first stream. Alternatively, the step of ensuring that the final first stream frame has the predetermined characteristic may be implemented by an encoder forcing the final first stream frame to black during an encoding operation, with a corresponding EOS code inserted either by the encoder or the digital stream insertion device.

In accordance with another aspect of the invention, an apparatus is provided which includes a packet filter having a first input corresponding to a first transport stream and an output corresponding to splice point data associated with the first input stream. The apparatus also includes a controller connected to the output of the packet filter and operative to direct a digital stream insertion device (a) to output a designated frame of a first transport stream as a frame with a predetermined frame characteristic, wherein the designated frame is the final first transport stream frame to be displayed before display of a second transport stream to be spliced with the first transport stream at a splice point, (b) to output transport packets having a predetermined packet characteristic in place of transport packets of the first stream for a period of time after the splice point, wherein the period of time is greater than the splice decoding delay associated with the splice point, and (c) to output transport packets of the second transport stream. The insertion device may also include a buffer connected to another output of the packet filter and receiving therefrom transport packets of the first stream having one or more predetermined packet identifiers, and a multiplexer having a first input connected to an output of the buffer and a second input connected to receive the second transport stream. The final first stream frame may be configured with the desired characteristic by the digital stream insertion device inserting the final frame as a black frame followed by an EOS code. Alternatively, an encoder can force the final frame to black in an encoding operation, and an EOS code can then be added by either the encoder or the digital stream insertion device.

The transport stream splicing techniques of the present invention ensure that no PCRs from a time base of an insertion stream are received until presentation of the last frame from the input stream has begun in accordance with the input stream time base. This feature avoids any confusion on the part of the decoder with regard to when to display the final frames from the input stream. In addition, the final frame from the input stream in a preferred embodiment is guaranteed to be black. Given that the MPEG-2 standard does not specify the display behavior of a decoder after an EOS code and at a time base discontinuity, the above features will generally provide an acceptable non-seamless splice. For example, an acceptable decoder response may be to freeze on the final frame of the input stream frame sequence until the first insertion stream frame is present at the decoder and its presentation time in accordance with the new time base has arrived.

BRIEF DESCRIPTION OF THE DRAWINGS

FIGS. 3 and 4 are block diagrams of an exemplary digital stream insertion system in accordance with the present invention.

DETAILED DESCRIPTION OF THE INVENTION

Figure 1A:
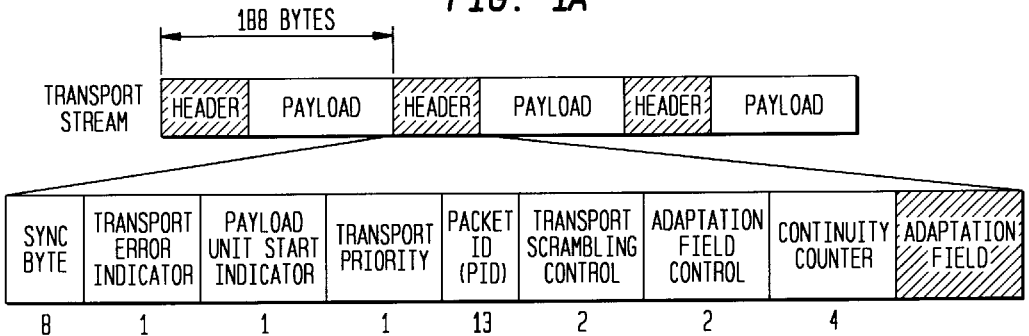
FIGS. 1A and 1B show transport packet and adaptation field formats in accordance with the MPEG-2 standard.

Although the present invention will be illustrated below primarily in conjunction with MPEG-2 transport streams, the invention is more broadly applicable to MPEG-2 program streams as well as to packet-based data streams generated in accordance with standards other than MPEG-2. These other standards include asynchronous transfer mode (ATM), transmission control protocol/Internet protocol (TCP/IP) and frame relay. The term "transport stream" as used herein should therefore be understood to include both MPEG-2 transport and program streams as well as any packet-based digital data stream which includes video, audio or other types of data, or various combinations thereof. The term "transport packet" refers to a packet within a transport stream. It should also be recognized that the invention is suitable for use in a wide variety of transport stream switching applications. For example, the invention can be readily applied to the simultaneous splicing of several insertion streams into single program transport streams of a given multi-program input transport stream, to the replacement of a subset of the single program streams with corresponding insertion streams, and to numerous other switching applications. The term "splicing" as used herein should therefore be understood to include these and other alternative transport stream switching applications. Finally, it should be noted that the term "frame" as used herein is intended to include pictures, single or multiple fields, progressive or interlaced frames, as well as other suitable arrangements of video and audio data.

FIG. 3 shows a digital stream insertion system 100 in accordance with the present invention. The system 100 includes a digital stream insertion device 102 which has an input 104 on which an MPEG-2 input transport stream is received via a broadcast channel or other suitable transmission medium. A server 106 supplies MPEG-2 insertion streams to the insertion device 102. An insertion stream may be an advertisement or the like to be inserted in a television program, movie or other broadcast. The server 106 may include a magnetic disk drive, an optical disk drive, an electronic memory or other suitable device for storing one or more insertion streams. The device 102 provides an output 108 corresponding to the input stream with the stream from server 106 inserted therein. An insertion stream from server 106 may replace a portion of the input stream or may be inserted in a predetermined interval of the input stream. The device 102 determines where to start and stop the stream insertion, and in effect switches the output between the input stream and the streams supplied by server 106. It should be noted that the insertion device 102 may be implemented as a separate circuit card in the server 106 or as suitably programmed processing software run by a central processing unit (CPU) or other processor in the server 106. Numerous hardware and/or software implementations consistent with the present invention will be apparent to those skilled in the art.

Figure 1B:
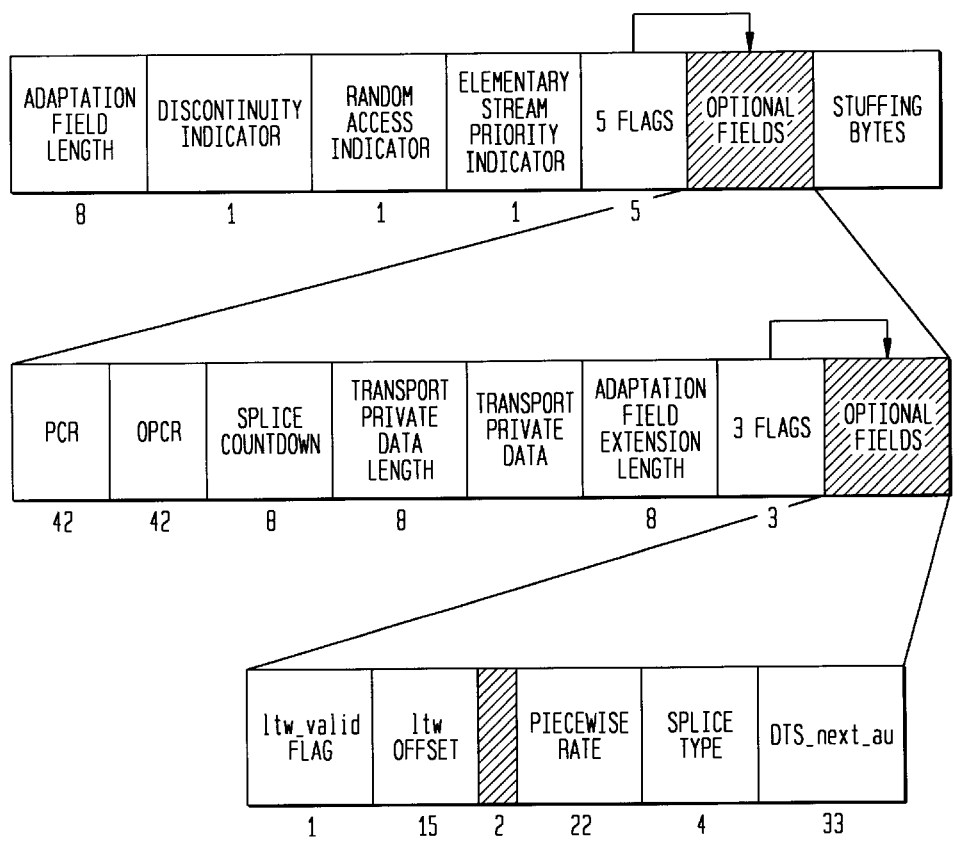
Figure 2A:
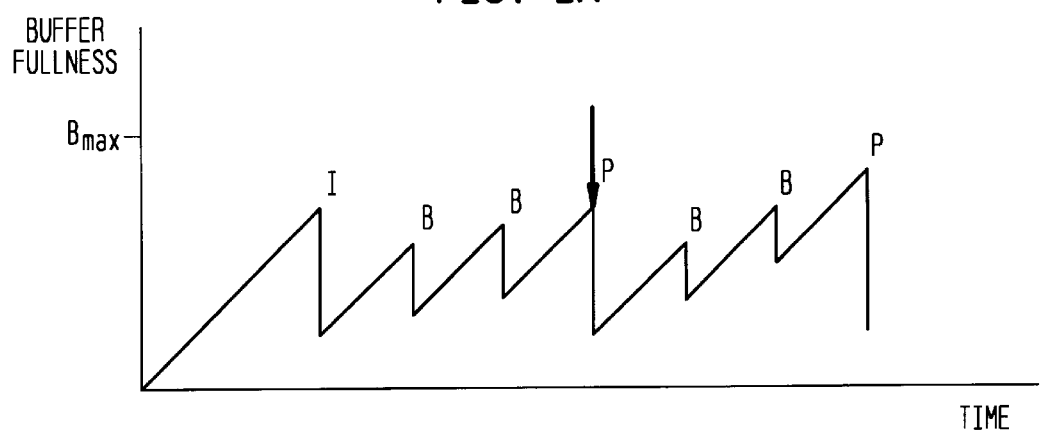
FIGS. 2A–2C illustrate a decoder buffer overflow condition resulting from a transport stream splicing operation.
Figure 2B:
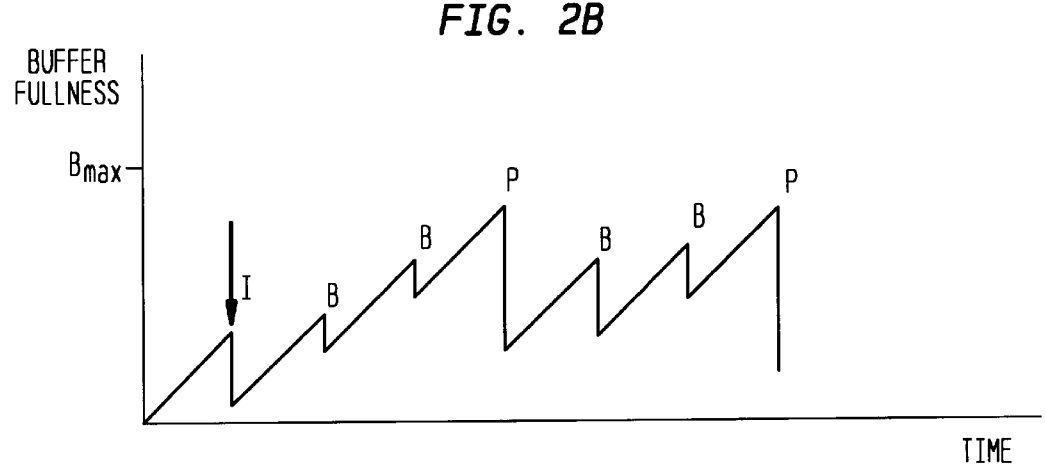
Figure 2C:
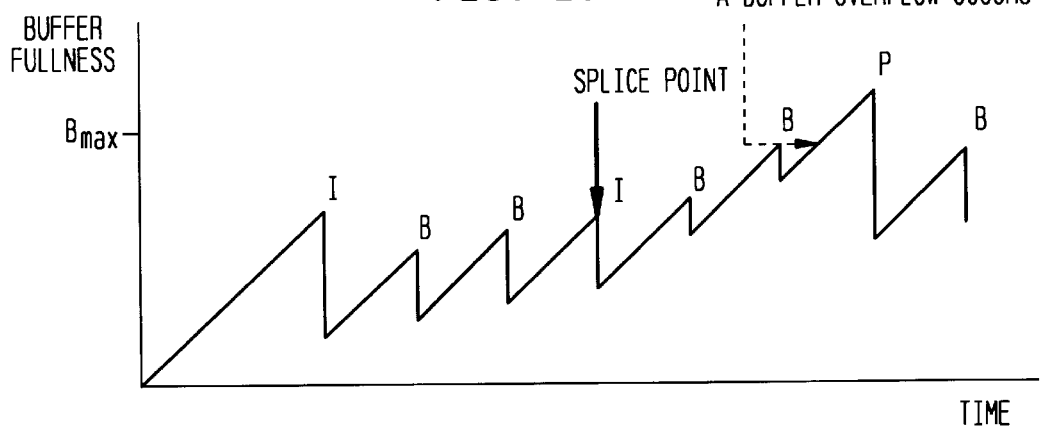

FIG. 4 shows a more detailed block diagram of one possible implementation of the digital stream insertion device 102 in system 100. The transport stream on input 104 is applied to a packet filter 120. The packet filter 120 detects the packet identifiers (PIDs) and splice point data in the input transport stream such that device 102 can determine where to start and/or stop an insertion operation. The splice point data may include the splice-related adaptation field data described above in conjunction with FIG. 1B, a subset of the splice-related adaptation field data, or any other data indicative of the presence, location or other characteristics of a splice point in the input transport stream. In applications in which it is desirable to output data at the same rate at which data is received, a clock recovery circuit (not shown) may be provided in device 102 to generate a clock signal from the input transport stream. Transport packets to be passed through device 102 to the output 108 are placed in a FIFO buffer 124. The buffer 124 has an output connected to a multiplexer 126. The server 106 supplies each of the N streams to be inserted in or otherwise combined with the input stream to a separate FIFO buffer 130-i, i=1, 2, ... N. The multiplexer 126 receives the input transport stream from buffer 124 and the insertion streams from buffers 130-i and splices them together to form the output transport stream. The splicing operations of the server 106, packet filter 120 and multiplexer 126 are directed and synchronized by a controller 132. The insertion device 102 including packet filter 120, buffers 124 and 130-i, and multiplexer 126 may be implemented as a suitably-programmed computer, microprocessor, application specific integrated circuit (ASIC) or other digital data processor or a portion thereof. For example, the device 102 could be configured as a special-purpose circuit card installed in a conventional personal computer. As noted above, the device 102 could also be part of the server 106.

The present invention is particularly well-suited for use in non-seamless splicing operations. As noted above, non-seamless splicing can result in the generation of decoding discontinuities. Such results are generally acceptable as long as the discontinuities occur at a time when the resulting visual and aural impairment is minimal. The exemplary embodiment of the present invention described below can be utilized to provide a spliced stream which is acceptable to the majority of viewers despite the presence of decoding discontinuities. The illustration of the present invention in the context of non-seamless splicing should not be construed as a limitation of the invention to such applications. It will be apparent to those of ordinary skill in the art that various aspects of the invention could be readily applied in seamless applications.

Figure 5:
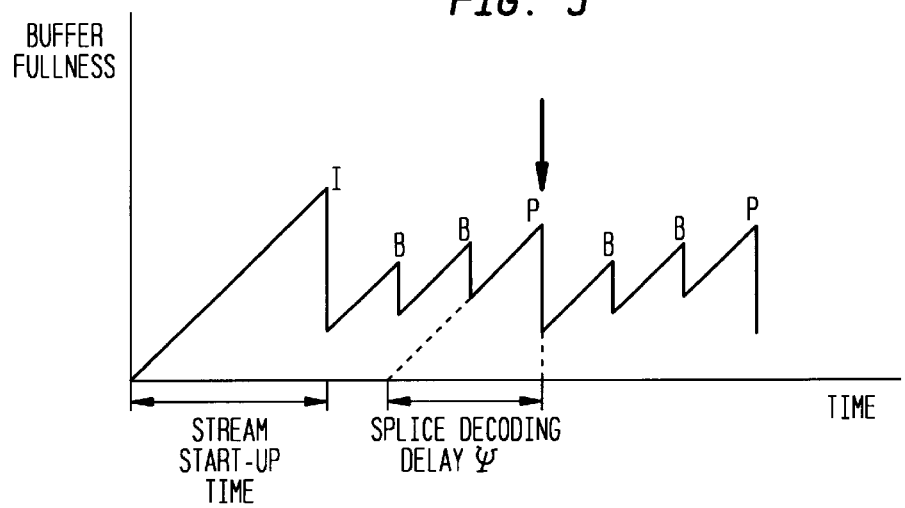
FIG. 5 is a decoder buffer trajectory illustrating splice decoding delay.

FIG. 5 illustrates an exemplary decoder buffer trajectory for a sequence of video frames in an input transport stream. The sequence includes intra-coded (I) frames, predictive-coded (P) frames and bidirectionally predictive-coded (B) frames. The trajectory represents a model of decoder buffer fullness as a function of time and is typically generated in a video buffering verifier (VBV) of a transport stream encoder which generated the corresponding transport stream. The splice point in the exemplary frame sequence is the first byte in the P-frame designated by the arrow. The designated P-frame is the first frame of the input stream that may be replaced by a frame from an insertion stream. The first byte of this P-frame enters the decoder buffer at the time indicated by the intersection of the slanted dotted line and the horizontal axis. The splice decoding delay $\Psi$ is shown in FIG. 5 as the amount of time that elapses from when the first byte of this P-frame enters the decoder buffer until the frame is removed from the decoder buffer and decoded. The stream start-up time is the amount of time the decoder waits before the first picture of a given stream is decoded. The stream start-up time in FIG. 5 is the interval from the origin to the time when the I-frame is removed from the decoder buffer and decoded.

It should be noted that the behavior of the encoder and decoder buffers is generally tightly coupled. The sum of the encoder buffer fullness plus the decoder buffer fullness a short fixed time later is substantially constant. This means that when the encoder buffer is nearly empty, a short time later the decoder buffer will be nearly full. Conversely, when the encoder buffer is nearly full, a short time later the decoder buffer will be nearly empty. The encoder can therefore control the splice decoding delay $\Psi$ by controlling the fullness of its own buffer. For example, the encoder can force small splice decoding delays by stuffing the picture preceding the splice point. This will force the decoder buffer fullness to be relatively low at the splice point, resulting in a short splice decoding delay.

Figure 6:
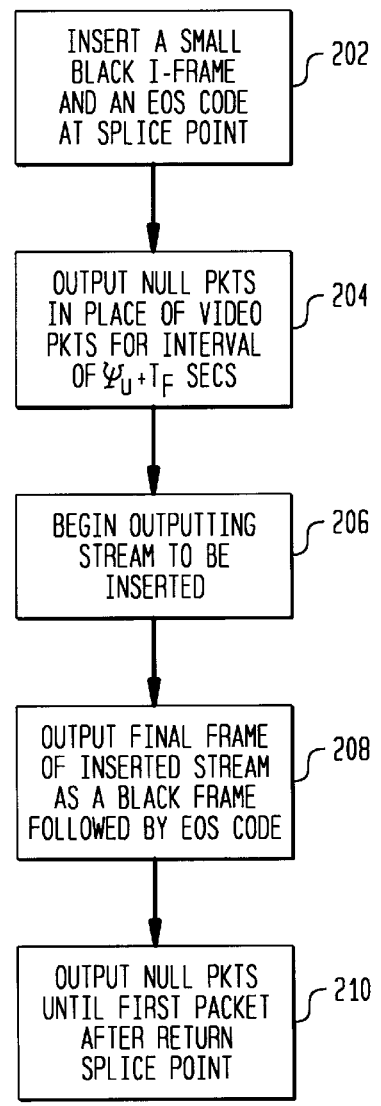
FIG. 6 is a flow diagram illustrating an exemplary non-seamless splicing operation in accordance with the present invention.

FIG. 6 illustrates an exemplary splicing operation in accordance with the present invention. The splice decoding delay $\Psi$ provided in this embodiment is in the range $\Psi_L \leq \Psi \leq \Psi_U$ and $\Psi_U$ is chosen to be on the order of zero to three frame intervals when the insertion device 102 inserts a black frame. In step 202, the stream insertion device 102 inserts a relatively small black I-frame at the splice point followed by an end-of-sequence (EOS) code. The EOS code indicates the end of a sequence of frames in the input transport stream which is to receive an insertion stream. The black I-frame represents the final frame of the input stream which is to be displayed before the display of a frame from the insertion stream. The size of the inserted black I-frame will determine the value of $\Psi_L$, and will typically vary depending upon the application. The value of $\Psi_L$ should be large enough to allow the I-frame to be transmitted prior to when it needs to be decoded. For example, it may be desirable in a given application to utilize a larger black frame to achieve a particular buffer state. In an alternative embodiment to be described below, in which an encoder forces the appropriate input frame to black, the value of $\Psi_L$ will generally be equal to zero.

It should be noted that the inserted frame need not be an I-frame in all applications. For example, a P-frame could be used in place of an I-frame, with each macroblock in the P-frame coded in an intra mode to thereby provide a frame which is basically an I-frame with a P-frame header. In addition, multiple frames in the input transport stream could be inserted or forced as black frames or could otherwise be configured to have a predetermined frame characteristic which, when presented, will be acceptable to most viewers. Furthermore, one or more frames could be inserted or forced as grey frames or as frames having another suitable display characteristic instead of being inserted or forced as black frames, or a decoder could be directed to freeze on a particular frame of the input stream prior to displaying the first frame of an insertion stream.

A number of different black I-frames at different resolutions could be stored in a memory within the insertion device 102. The device 102 will then have to be able to determine the input stream resolution in order to know which stored black I-frame to insert. This could be accomplished by using a descriptor that carries this information, by private arrangement with the supplier of the input transport stream, or by parsing the video bitstream to determine its resolution. The insertion device 102 should generally monitor the transport packet continuity counters in order to insure continuity when the black I-frame is inserted. It should be noted that the insertion device 102 is simplified in the alternative embodiment to be described below in which the encoder forces the black frame. After the black I-frame is inserted, the discontinuity indictor bit can be set in the first packet of the stream being inserted, and prestored continuity counter values may be used. The insertion device 102 or the corresponding encoder should also set the discontinuity indicator bit in the first input stream packet after a return splice point. The return splice point is used in embodiments of the invention in which the insertion device 102 returns to outputting packets from the input stream after an insertion operation, and generally identifies the first packet of the input stream which is to be output after the insertion.

In step 204, the stream insertion device 102 will output null packets in place of video transport packets from the input transport stream for an interval of $\Psi_U + T_F$ seconds, where $T_F$ is the maximum video frame time in the input stream. The time $T_F$ should take into account that the input stream may include telecine material generated from 24 frame per second film using a 3:2 pulldown technique. Steps 202 and 204 ensure that the decoder buffer will be empty after the black I-frame is decoded. These steps also ensure that the last displayed frame from the input stream frame sequence will be the black I-frame, and that no transport packets from the insertion stream will begin to arrive at the decoder until after display of the black I-frame has begun. Referring again to FIG. 5, the black I-frame will be decoded during the time that the P-frame marked by the arrow would have been decoded had the splice not occurred. The black I-frame will be displayed during the time that the third B-frame would have been displayed had the splice not occurred.

It should be noted that the audio splice point in a given transport stream will generally be later in time than the video splice point. This is because the video buffer in the encoder is generally larger than the audio buffer, so the video frame marked by the splice point begins arriving at the decoder before the audio that will be decoded with that video frame. If the video splice point occurs at time T, the audio splice point will thus generally occur before the time $T + \Psi_U + T_F$. After the audio splice point arrives, the insertion device 102 will also output null packets in place of audio transport packets. This will continue for as long as null packets are being output in place of video transport packets. If a given input transport stream includes multiple elementary audio streams, each audio stream could be handled in an analogous manner.

After the interval of null packet insertion has passed, the insertion device 102 begins in step 206 to output the transport stream to be inserted. In this example, the stream being inserted is assumed to start with a closed group-of-picture (GOP) configuration, and to have a start-up time of less than S seconds. This ensures that the maximum gap between the end of the input stream frame sequence and the beginning of the stream being inserted, referred to as $G_{start, max}$, satisfies the following expression:

$$G_{start,max} < \Psi_U + T_F + S + T_F$$

The second $T_F$ in the preceding expression is attributable to the possible presence of B-frames in the input or inserted transport streams. For B-frames, the first frame in the display order is not displayed until one frame period after the first frame in the coding order is decoded. Selecting $\Psi_U$ to be less than two frame times, and S to be less than three frame times, will ensure that the maximum display gap, in the absence of telecine material, is less than seven frames. In the absence of telecine material, seven frames represents less than 0.25 seconds for NTSC signals, and only slightly more than a quarter of a second for PAL signals. In an NTSC ad insertion application, a 30 second ad typically lasts only 29.5 seconds, so the maximum display gap will represent at most half of the 0.5 second dead time in the inserted ad. Of course, other values for $\Psi_U$ and S could be selected in other applications.

The transition back from insertion stream to input stream is carried out as follows. As shown in step 208, the last displayed frame from the insertion stream is a black frame, and an EOS code follows this frame. After the last byte of the insertion stream is delivered, the insertion device 102 in step 210 will output null packets until arrival of the first input stream transport packet after the return splice point. At that time, the insertion device 102 will again return to delivering input stream packets to the output until the next insertion operation. Steps 208 and 210 should be performed such that the presentation time of the last picture of the insertion stream has passed before the first input stream packet after the return splice point is delivered. This can be provided in NTSC ad insertion applications by configuring the input transport stream such that the splice decoding delay at the return splice point is less than eight frames, which does not place a significant constraint on the encoder. If $G_{stop,min}$ is the minimum gap at the end of an inserted ad, and $T_{ad}$ is the duration of the inserted ad, the following time budget will result:

| | |
|---|---|
| $G_{start,max}$ | 7 frames |
| $T_{ad}$ | 0.5 seconds less than the duration of the ad break |
| $G_{stop,min}$ | 8 frames |

In an alternative embodiment of the invention, the insertion device 102 does not insert a frame at the splice point. Instead, the encoder which generated the input transport stream can be utilized to force a black frame at a particular time. For example, the encoder can force to black a final input stream frame that will be displayed during the frame time that the frame marked by the splice point would normally be decoded. In the exemplary input transport stream frame sequence of FIG. 5, the encoder could force the initial I-frame in the sequence to black. The insertion device 102 then inserts just an EOS code rather than a black I-frame followed by an EOS code as in the previous embodiment. The EOS code could be inserted in this embodiment by the encoder rather than by the insertion device 102.

This alternative embodiment has the advantage of eliminating one frame time from the constraints of the previous embodiment. Also, in this alternative embodiment the value of $\Psi_L$ becomes zero, the insertion device 102 need only insert null packets for an interval of $\Psi_U$ seconds after the video splice point, the audio splice point occurs less than $\Psi_U$ seconds after the video splice point, and $G_{start,max}$ is reduced by one frame time. Other implementations of the present invention may involve the insertion device 102 overwriting an encoded frame with a black frame, or simply allowing the decoder to freeze on the last non-black frame.

Upon receipt of an EOS code, the decoder preferably freezes the last frame displayed, which will usually be black in accordance with the above-described techniques, and then begins decoding again as soon as new transport stream data arrives and its presentation time occurs. Other decoder behavior could also be acceptable in a given application.

The above techniques have the advantage that no PCRs from a new time base arrive at the decoder until presentation of the last picture from the old time base has begun. It should be noted that this will generally not be the case in a seamless splice, and that seamless splices therefore place a greater demand on the decoder display logic.

The transport streams to be inserted can be stored on the server 106 as single program transport streams. In some embodiments of the invention, packets from the input stream which will receive the insertion can simply be overwritten with packets from the stream or streams to be inserted. Rate-matching constraints may require that some of the input stream packets be overwritten with null packets. Other embodiments may utilize a multiplexing operation such as that illustrated in the exemplary embodiment of FIG. 4.

It should be understood that the foregoing description is merely illustrative of the invention. Numerous alternative embodiments within the scope of the appended claims will be apparent to those of ordinary skill in the art.

The claimed invention is:

1. A method of splicing a plurality of transport streams, the method comprising the steps of:

inserting a black frame in a first transport stream, wherein the black frame is the final first transport stream frame to be displayed before display of a second transport stream to be spliced with the first transport stream at a splice point, wherein the inserted black frame ensures continuity between the first and second streams to avoid visual flickering;

storing said first transport stream in a buffer;

outputting transport packets of a third transport stream, said transport packets being null packets and having a predetermined packet characteristic in place of transport packets of the first stream for a period of time after the splice point to inhibit decoder underflow and overflow, wherein the period of time is greater than the splice decoding delay associated with the splice point;

emptying said buffer during said period of time; and outputting transport packets of the second transport stream and storing the outputted second transport stream into the emptied buffer, such that timing errors will be eliminated since frames of the second transport stream do not enter said buffer until all frames of the first transport stream emptied, which further inhibits decoder underflow and overflow.

2. The method of claim 1 wherein at least one of the first and second transport streams is an MPEG-2 compliant transport stream.

3. The method of claim 1 wherein a frame having the predetermined frame characteristic is a black frame.

4. The method of claim 1 wherein the transport packets having the predetermined packet characteristic are null packets.

5. The method of claim 1 wherein the step of outputting transport packets having a predetermined packet characteristic in place of transport packets of the first stream for a period of time after a splice point further includes outputting null packets for a period of time which is greater than or equal to the sum of the splice decoding delay and the maximum frame time in the first stream.

6. The method of claim 1 further including the step of outputting null packets for a second period of time after the transport packets of the second stream have been output, wherein the second period of time is sufficient to allow a final frame of the second transport stream to be displayed.

7. The method of claim 1 wherein the step of ensuring that the final first transport stream frame will have a predetermined frame characteristic further includes the step of inserting a frame with the predetermined frame characteristic into the first stream as a final frame.

8. The method of claim 7 wherein the step of inserting a frame as the final first transport stream frame further includes the additional step of inserting a code indicative of the end of a sequence of frames in the first stream.

9. The method of claim 1 wherein the step of ensuring that the final first transport stream frame will have a predetermined frame characteristic further includes the step of forcing the final first transport stream frame to black in an encoding operation.

10. The method of claim 9 wherein the step of forcing the final first transport stream frame to black in an encoding operation further includes the additional step of inserting a code indicative of the end of a sequence of frames in the first stream.

11. An apparatus for splicing a plurality of transport streams, the apparatus comprising:

a packet filter having a first input corresponding to a first transport stream and a first output corresponding to splice point data associated with the first input stream; and a controller connected to the first output of the packet filter and operative to direct a digital stream insertion device to insert a black frame in a first transport stream, wherein the black frame is the final first transport stream frame to be displayed before display of a second transport stream to be spliced with the first transport stream at a splice point, wherein the inserted black frame ensures continuity between the first and second streams to avoid visual flickering; and a buffer for storing said first transport stream, wherein said controller being further operative to output transport packets of a third transport stream, said transport packets being null packets and having a predetermined packet characteristic in place of transport packets of the first steam for a period of time after the splice point to inhibit decoder underflow and overflow, wherein the period of time is greater than the splice decoding delay associated with the splice point, being further operative to empty all frames of the first transport steam from said buffer, and being further operative to output transport packets of the second transport stream, where the outputted second transport stream are stored in the emptied buffer, such that timing errors will be eliminated since frames of the second transport stream do not enter said buffer until all frames of the first transport steam are emptied, which further inhibits decoder underflow and overflow.

12. The apparatus of claim 11 further including:

a buffer connected to a second output of the packet filter and receiving therefrom transport packets of the first stream having one or more predetermined packet identifiers; and a multiplexer having a first input connected to an output of the buffer, and one or more additional inputs connected to receive the second transport stream and any other transport streams to be spliced with the first stream.

13. The apparatus of claim 11 wherein the insertion device further includes a buffer having an input connected to receive the second transport stream and an output connected to an input of a multiplexer which combines transport packets of the first stream, the second stream and any additional streams.

14. The apparatus of claim 11 wherein at least one of the first and second transport streams is an MPEG-2 compliant transport stream.

15. The apparatus of claim 11 wherein a frame having the predetermined frame characteristic is a black frame.

16. The apparatus of claim 11 wherein the transport packets having the predetermined packet characteristic are null packets.

17. The apparatus of claim 11 wherein the period of time after the splice point is greater than or equal to the sum of the splice decoding delay and the maximum frame time in the first stream.

18. The apparatus of claim 11 wherein the controller is further operative to direct the digital stream insertion device to output null packets for a second period of time after the transport packets of the second stream have been output, wherein the second period of time is sufficient to allow a final frame of the second transport stream to be displayed.

19. The apparatus of claim 11 wherein the controller is further operative to direct the insertion of a frame having the predetermined frame characteristic into the first stream as the final frame.

20. The apparatus of claim 19 wherein the controller is further operative to direct the insertion of a code into the first stream indicative of the end of a sequence of frames in the first stream.

21. The apparatus of claim 11 wherein an encoder is operative to provide the final frame having the predetermined frame characteristic by forcing the final first transport stream frame to black in an encoding operation.

22. The apparatus of claim 21 wherein the encoder is further operative to direct the insertion of a code into the first stream indicative of the end of a sequence of frames in the first stream.

* * * * *